(12) United States Patent
Romero et al.

(10) Patent No.: US 12,398,900 B2
(45) Date of Patent: Aug. 26, 2025

(54) HVAC CONTROLLER INDICATING CURRENT TEMPERATURE AND SET POINT TEMPERATURE

(71) Applicant: RESIDEO LLC, Golden Valley, MN (US)

(72) Inventors: Arturo Romero, Chihuahua (MX); Karla Morales, Chihuahua (MX); Claudia Prieto, Chihuahua (MX); Cesar Alejandro Arzate, Chihuahua (MX); Jonathan Erbacher, Minneapolis, MN (US); Raul Rascon Perez, Chihuahua (MX)

(73) Assignee: RESIDEO LLC, Golden Valley, MN (US)

( * ) Notice: Subject to any disclaimer, the term of this patent is extended or adjusted under 35 U.S.C. 154(b) by 211 days.

(21) Appl. No.: 17/756,589

(22) PCT Filed: Dec. 4, 2020

(86) PCT No.: PCT/US2020/063317
§ 371 (c)(1),
(2) Date: May 27, 2022

(87) PCT Pub. No.: WO2021/113640
PCT Pub. Date: Jun. 10, 2021

(65) Prior Publication Data
US 2023/0003409 A1 Jan. 5, 2023

Related U.S. Application Data

(60) Provisional application No. 62/943,731, filed on Dec. 4, 2019.

(51) Int. Cl.
*F24F 11/56* (2018.01)
*F24F 11/52* (2018.01)
(Continued)

(52) U.S. Cl.
CPC ............ *F24F 11/56* (2018.01); *F24F 11/523* (2018.01); *G05G 1/08* (2013.01)

(58) Field of Classification Search
CPC .......... F24F 11/56; F24F 11/52; F24F 11/523; G05G 1/08; G05D 23/1902; G05D 23/1904; G05D 23/1906
See application file for complete search history.

(56) References Cited

U.S. PATENT DOCUMENTS 5,644,302 A * 7/1997 Hana .................. G05D 23/1905
341/35
5,931,378 A 8/1999 Schramm
(Continued)

FOREIGN PATENT DOCUMENTS

DE 29505606 U1 2/1996
DE 19958845 A1 6/2001
(Continued)

OTHER PUBLICATIONS

U.S. Appl. No. 17/756,595, filed Dec. 4, 2020, naming inventors Jones et al.

*Primary Examiner* — Marc E Norman
(74) *Attorney, Agent, or Firm* — Greenberg Traurig, LLP; Ryan D. Sharp; David J. Dykeman

(57) ABSTRACT

In some examples, a device controls a heating, ventilation, and air conditioning (HVAC) system within a building. The device includes an analog display including a set of markers, a stepper motor, and a pointer connected to the stepper motor. Additionally, the device includes processing circuitry configured to control the stepper motor in order to cause the pointer to indicate a first marker of the set of markers, wherein the first marker corresponds to a current parameter value and control a dial to indicate a set point parameter
(Continued)

value by indicating a second marker of the set of markers which corresponds to the set point parameter value.

20 Claims, 7 Drawing Sheets

(51) Int. Cl.
 *F24F 11/523* (2018.01)
 *G05G 1/08* (2006.01)

(56) References Cited

U.S. PATENT DOCUMENTS

| | | | |
|---|---|---|---|
| 6,581,846 B1* | 6/2003 | Rosen | F23N 5/203 |
| | | | 165/238 |
| 6,726,112 B1 | 4/2004 | Ho | |
| 2013/0345883 A1 | 12/2013 | Sloo et al. | |
| 2014/0319232 A1 | 10/2014 | Gourlay et al. | |
| 2015/0308705 A1 | 10/2015 | Sloo et al. | |
| 2016/0146645 A1 | 5/2016 | Kielb et al. | |
| 2018/0080669 A1* | 3/2018 | Corcoran | F24F 11/62 |
| 2021/0207837 A1* | 7/2021 | Diaz | F24F 11/523 |
| 2023/0003406 A1* | 1/2023 | Jones | F24F 11/523 |
| 2023/0003407 A1* | 1/2023 | Gonzalez | F24F 11/523 |

FOREIGN PATENT DOCUMENTS

| | | |
|---|---|---|
| DE | 102012200785 A1 | 7/2013 |
| JP | 2009302004 A | 12/2009 |
| WO | 2017035227 A1 | 3/2017 |
| WO | 2017210517 A2 | 12/2017 |

\* cited by examiner ical Patent Application No. PCT/US2020/063317, filed 4
HVAC CONTROLLER INDICATING CURRENT TEMPERATURE AND SET POINT TEMPERATURE This application is a national stage entry of WO International Patent Application No. PCT/US2020/063317, filed 4 Dec. 2020, which claims the benefit of U.S. Provisional Patent Application No. 62/943,731, filed 4 Dec. 2019, the entire content of both being incorporated herein by reference.

TECHNICAL FIELD

The disclosure relates to heating, ventilation, and air condition (HVAC) systems and thermostats for buildings.

BACKGROUND

A heating, ventilation, and air conditioning (HVAC) controller can control a variety of devices such as a furnace, a heat pump including a geothermal heat pump, a boiler, air conditioning unit, forced air circulation, and other similar equipment to control the internal climate conditions of a building. In some examples, a thermostat can control different devices depending on the outside temperature, temperature inside the building, the time of day, and other factors. Environmental control systems may also include evaporative cooling systems, also referred to as "swamp coolers" in this disclosure, as well as other systems such as window mounted heat exchangers and two-part heat exchangers, which may be used for heating or cooling building spaces. Two-part heat exchangers may include an inside heat exchanger and an outside heat exchanger connected by piping. To simplify the explanation, an environmental control system will be referred to as an HVAC system, unless otherwise noted.

SUMMARY

In general, this disclosure describes an HVAC controller including a display which can show a set point temperature for an area, a current temperature of the area, and one or more other parameters. In some examples, the HVAC controller may include an analog display including a set of markers and a pointer connected to a stepper motor. The stepper motor may set a position of the pointer to indicate, or "point," at a marker corresponding to a current temperature of the area. Additionally, the dial may include a set of LEDs which indicate one or more markers of the set of markers which correspond to one or more temperature set points.

In some examples, a device controls a heating, ventilation, and air conditioning (HVAC) system within a building. The device includes an analog display including a set of markers, a stepper motor, and a pointer connected to the stepper motor. Additionally, the device includes processing circuitry configured to control the stepper motor in order to cause the pointer to indicate a first marker of the set of markers, wherein the first marker corresponds to a current parameter value and control a dial to indicate a set point parameter value by indicating a second marker of the set of markers which corresponds to the set point parameter value.

In some examples, a method includes controlling, by processing circuitry of a device for controlling a heating, ventilation, and air conditioning (HVAC) system within a building, a stepper motor in order to cause a pointer to indicate a first marker of a set of markers, wherein an analog display comprises the set of markers, and wherein the first marker corresponds to a current parameter value and controlling, by the processing circuitry, a dial to indicate a set point parameter value by indicating a second marker of the set of markers which corresponds to the set point parameter value.

In some examples, a device controls a heating, ventilation, and air conditioning (HVAC) system within a building. The device includes an analog display including a set of markers, a stepper motor, and a pointer connected to the stepper motor. Additionally, the device includes processing circuitry configured to control the stepper motor in order to cause the pointer to indicate a first marker of the set of markers, wherein the first marker corresponds to a current parameter value and control a dial to indicate a set point parameter value by indicating a second marker of the set of markers which corresponds to the set point parameter value.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

DETAILED DESCRIPTION

Figure 1:
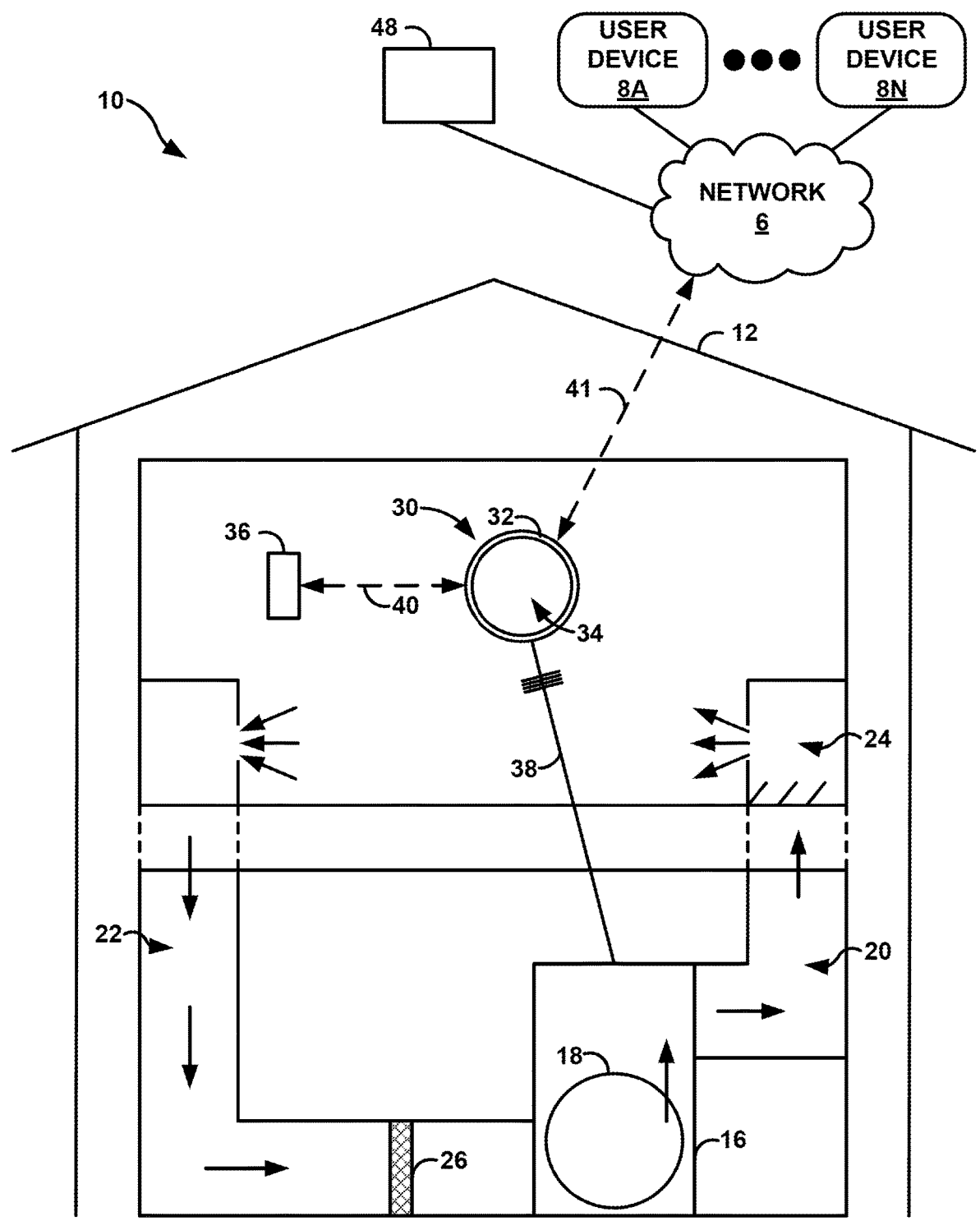
FIG. 1 is a block diagram illustrating an example heating, ventilation, and air conditioning (HVAC) system in a building, in accordance with one or more techniques described herein.

FIG. 1 is a block diagram illustrating an example heating, ventilation, and air conditioning (HVAC) system 10 in a building 12, in accordance with one or more techniques described herein. HVAC system 10 includes HVAC component(s) 16, a supply air duct 20, a return air duct 22 (collectively, "ducts 20, 22"), dampers 24, and air filters 26. Additionally, HVAC system 10 includes an HVAC controller 30 configured to control HVAC component(s) 16 to regulate one or more parameters within building 12. HVAC controller 30 may include a dial 32 and an analog display 34.

HVAC system 10 may include one or more devices for regulating an environment within building 12. For example, HVAC controller 30 may be configured to control the comfort level (e.g., temperature and/or humidity) in building 12 by activating and deactivating HVAC component(s) 16 in a controlled manner. HVAC controller 30 may be configured to control HVAC component(s) 16 via a wired or wireless communication link 38. In some examples, a wired communication link 38 may connect HVAC component(s) 16 and HVAC controller 30. HVAC controller 30 may be a thermostat, such as, for example, a wall mountable thermostat. In some examples, HVAC controller 30 may be programmable to allow for user-defined temperature set points to control the temperature of building 12. Based on sensed temperature of building 12, HVAC controller 30 may turn on HVAC component(s) 16 or turn off HVAC component(s) 16 in order to reach the user-defined temperature set point. Although this disclosure describes HVAC controller 30 (and controllers shown in other figures) as controlling HVAC component(s) 16, external computing device 36 may also be configured to perform these functions. The techniques of this disclosure will primarily be described using examples related to temperature, but the systems, devices, and methods described herein may also be used in conjunction with other sensed properties, such as humidity or air quality. In some examples, HVAC controller 30 may be configured to control all of the critical networks of a building, including a security system.

HVAC component(s) 16 may provide heated air (and/or cooled air) via the ductwork throughout the building 12. As illustrated, HVAC component(s) 16 may be in fluid communication with one or more spaces, rooms, and/or zones in building 12 via ducts 20, 22, but this is not required. In operation, when HVAC controller 30 outputs a heat call signal to HVAC component(s) 16, HVAC component(s) 16 (e.g., a forced warm air furnace) may turn on (begin operating or activate) to supply heated air to one or more spaces within building 12 via supply air ducts 20. HVAC component(s) 16, which include an air movement device 18 (e.g., a blower or a fan), can force the heated air through supply air duct 20. In this example, cooler air from each space returns to HVAC component(s) 16 (e.g. forced warm air furnace) for heating via return air ducts 22. Similarly, when a cool call signal is provided by HVAC controller 30, a cooling device (e.g., an air conditioning (AC) unit) of HVAC component(s) 16 may turn on to supply cooled air to one or more spaces within building 12 via supply air ducts 20. Air movement device 18 may force the cooled air through supply air duct 20. In this example, warmer air from each space of building 12 may return to HVAC component(s) 16 for cooling via return air ducts 22.

In some examples, HVAC component(s) 16 may include any one or combination of a fan, a blower, a furnace, a heat pump, an electric heat pump, a geothermal heat pump, an electric heating unit, an AC unit, a humidifier, a dehumidifier, an air exchanger, an air cleaner, a damper, a valve, and a fan, however this is not required. HVAC component(s) 16 may include any device or group of devices which contributes to regulating the environment within building 12 based on signals received from HVAC controller 30 or contributes to regulating the environment within building 12 independently from HVAC controller 30.

Ducts 20, 22 may include one or more dampers 24 to regulate the flow of air, but this is not required. For example, one or more dampers 24 may be coupled to HVAC controller 30 and can be coordinated with the operation of HVAC component(s) 16. HVAC controller 30 may actuate dampers 24 to an open position, a closed position, and/or a partially open position to modulate the flow of air from the one or more HVAC components to an appropriate room and/or space in building 12. Dampers 24 may be particularly useful in zoned HVAC systems, and may be used to control which space(s) in building 12 receive conditioned air and/or receives how much conditioned air from HVAC component(s) 16.

In many instances, air filters 26 may be used to remove dust and other pollutants from the air inside building 12. In the example shown in FIG. 1, air filters 26 is installed in return air duct 22 and may filter the air prior to the air entering HVAC component(s) 16, but it is contemplated that any other suitable location for air filters 26 may be used. The presence of air filters 26 may not only improve the indoor air quality but may also protect the HVAC component(s) 16 from dust and other particulate matter that would otherwise be permitted to enter HVAC component(s) 16.

HVAC controller 30 may include any suitable arrangement of hardware, software, firmware, or any combination thereof. For example, HVAC controller 30 may include processing circuitry comprising microprocessors, digital signal processors (DSPs), application specific integrated circuits (ASICs), field-programmable gate arrays (FPGAs), or equivalent discrete or integrated logic circuitry, or a combination of any of the foregoing devices or circuitry. Accordingly, the processing circuitry may include any suitable structure, whether in hardware, software, firmware, or any combination thereof, to perform the functions ascribed herein to HVAC controller 30.

Although not shown in FIG. 1, HVAC controller 30 may include a memory configured to store information within HVAC controller 30 during operation. The memory may include a computer-readable storage medium or computer-readable storage device. In some examples, the memory includes one or more of a short-term memory or a long-term memory. The memory may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, the memory is used to store program instructions for execution by the processing circuitry of HVAC controller 30. In some examples, the memory of HVAC controller 30 may be able to store data to and read data from memory included in external computing device 36 and/or memory included in external database 48. The memory may be used for storing network settings such as an Internet Protocol (IP) address and/or a Media Access Control (MAC) address of HVAC controller 30, external computing device 36, and/or a router.

In some examples, HVAC controller 30 may include a set of wire terminals which make up a terminal block (e.g., a wall plate or a terminal plate) for receiving a set of control wires for one or more HVAC component(s) 16 of HVAC system 10. The memory of HVAC controller 30 may store one or more wiring configurations for HVAC component(s) 16, allowing HVAC controller 30 to determine which of HVAC component(s) 16 are connected to HVAC controller 30. The memory of HVAC controller 30 may also store settings for HVAC system 10 which correspond to the one or more wiring configurations for HVAC component(s) 16. For example, if HVAC controller 30 is wired to an AC unit of HVAC component(s) 16, HVAC controller 30 may determine one or more settings for controlling the AC unit to turn on and turn off.

In some examples, the memory of HVAC controller 30 may store program instructions, which may include one or more program modules, which are executable by HVAC controller 30. When executed by HVAC controller 30, such program instructions may cause HVAC controller 30 to provide the functionality ascribed to it herein. The program instructions may be embodied in software, firmware, and/or RAMware.

In some examples, HVAC controller 30 may include a dial 32 which is located at an outer circumference of HVAC controller 30. HVAC controller 30 may be fixed to a wall or another surface such that dial 32 may be rotated relative to one or more other components (e.g., analog display 34) of HVAC controller 30. Dial 32 may represent a user interface such that processing circuitry of HVAC controller 30 may receive, dial 32 and/or dial circuitry electrically connected to dial 32, information indicative of a user input. In some examples, the user input may represent a user selection of a set point parameter value (e.g., a set point temperature), a user selection of information to be displayed by HVAC controller 30, or a user selection of another setting. In some examples, dial 32 may smoothly rotate with respect to analog display 34. In some examples, dial 32 may rotate with one or more steps such that as dial 32 rotates, dial 32 "snaps" into position after every interval of rotational distance. In some examples, dial 32 may smoothly rotate with respect to analog display 34 and HVAC controller 30 may output an audio signal (e.g., a clicking noise) for every interval of rotational position (e.g., every one degree) in which dial 32 rotates.

In some examples, dial 32 does not move inwards in response to a force applied to dial 32. For example, dial 32 may rotate about a center axis which passes through a center of dial 32 without moving along the center axis in response to one or more forces applied to dial 32. When HVAC controller 30 is mounted on a vertical surface such as a wall, HVAC controller 30 may prevent dial 32 from depressing inwards towards the vertical surface while allowing the dial 32 to rotate.

In some examples, dial 32 may include a set of light-emitting diodes (LEDs) configured to illuminate a portion or a whole of dial 32, but this is not required. The processing circuitry of HVAC controller 30 may selectively illuminate one or more LEDs of the set of LEDs in order to indicate a set point temperature or convey other information. In some examples, the set of LEDs included in dial 32 may illuminate dial 32 to indicate that HVAC system 10 is in a heating or indicate that HVAC system 10 is cooling. For example, when HVAC system 10 is heating (e.g., HVAC controller 30 is outputting one or more instructions for HVAC component(s) 16 to increase a temperature within building 12), the LEDs of dial 32 cause dial 32 to illuminate at a first color. When HVAC system 10 is cooling (e.g., HVAC controller 30 is outputting one or more instructions for HVAC component(s) 16 to decrease a temperature within building 12), the LEDs of dial 32 cause dial 32 to illuminate at a second color. In this way, the LEDs of dial 32 may indicate whether HVAC system 10 is heating or cooling.

Analog display 34 may include information relating to one or more aspects of an area in which HVAC controller 30 is located (e.g., a room in which HVAC controller 30 is located, a building in which HVAC controller 30 is located, an area outside of a building in which HVAC controller 30 is located, or any combination thereof). Analog display 34 may be round in shape and analog display 34 may be located an area within a circumference of dial 32 such that edges of dial 32 are visible around an outer circumference of analog display 34. At least part of dial 32 and analog display 34 may represent an outer surface of HVAC controller 30. In some cases, HVAC controller 30 may receive user input to one or both of dial 32 and analog display 34.

A user may interact with HVAC controller 30 through a mobile phone, a tablet, a computer, or another device. For example, user devices 8A-8N (collectively, "user devices 8") may communicate with HVAC controller 30 via network 6. HVAC controller 30 may, in some examples, be configured to communicate directly with network 6 without communicating with network 6 via a gateway device (e.g., a Wi-Fi router) within building 12. In some examples, HVAC controller 30 may receive instructions from one or more of user devices 8. The instructions may include, for example, a request to change a set point temperature for an area within building 12. HVAC controller 30 may change the set point temperature in response to receiving the instruction. In turn, HVAC controller 30 may control HVAC component(s) 16 to control the temperature within building 12 to reach the new set point.

In some examples, responsive to detecting a rotation of dial 32 while HVAC controller 30 is in the idle state, HVAC controller 30 transitions out of the idle state to a set point state. HVAC controller 30 may change a temperature set point for an area within building 12 in response to detecting the rotation of dial 32. In other words, HVAC controller 30 may determine that a rotation of dial 32 while HVAC controller 30 is in the idle state represents a user request to change a temperature set point. In transitioning out of the idle state, the processing circuitry of HVAC controller 30 may display the temperature set point for the area within building 12 on analog display 34. Additionally, HVAC controller 30 may display the temperature set point changing as dial 32 rotates. For example, the analog display 34 may show the temperature set point cycle through a range of degrees, where each change from one degree to another degree is reflected on analog display 34. In some examples, HVAC controller 30 may emit a noise each time the temperature set point changes from one degree value to another degree value. The noise may represent a clicking noise, a tapping noise, or another type of noise.

In some examples, HVAC controller 30 may control HVAC components 16 based on more than one set point. For example, HVAC controller 30 may determine whether one or both of a first set point mode and a second set point mode is activated. In some examples, the first set point mode represents a cooling temperature set point mode and the second set point mode represents a heating set point mode. In the cooling set point mode, the HVAC controller 30 may be configured to change a cooling set point, and in the heating set point mode, the HVAC controller 30 may be configured to change a heating set point. A cooling set point may represent a temperature set point for controlling HVAC components 16 to decrease or maintain a temperature within building 12 as compared with a temperature outside of building 12. A heating set point may represent a temperature set point for controlling HVAC components 16 to increase or maintain a temperature within building 12 as compared with a temperature outside of building 12.

In some examples, HVAC controller 30 is configured to receive user input representing an instruction to enter the first set point mode. In some examples, HVAC controller 30 is configured to receive user input representing an instruction to enter the second set point mode. HVAC controller 30 may enter the second set point mode in response to receiving user input representing a request to enter the second set point mode. For example, HVAC controller 30 may deactivate the first set point mode and activate the second set point mode in response to receiving information indicative of a user input to a mode button representing a request to enter the second set point mode. Alternatively, HVAC controller 30 may enter the first set point mode in response to receiving user input representing a request to enter the first set point mode. For example, HVAC controller 30 may deactivate the second set point mode in response to receiving information indicative of a user input to a mode button representing a request to enter the first set point mode.

HVAC controller 30 is configured to cause, based on the first set point mode being activated, the first set point of the device to change in response to receiving a rotation input to dial 32. Additionally, HVAC controller 30 is configured to cause, based on the second set point mode being activated, the second set point of the device to change in response to receiving a rotation input to dial 32. In this way, HVAC controller 30 may control one or both of the first set point and the second set point to change based on a rotation input to dial 32.

In some examples, analog display 34 includes a set of markers, a stepper motor, and a pointer connected to the stepper motor. In some examples, analog display 34 is circular in shape. The set of markers may be arranged in a "fan" shape, such that the markers are spaced along the circumference of analog display 34. In some examples, one or more of the markers may be labelled with a temperature value such that each marker of the set of markers corresponds to a temperature value. HVAC controller 30 may be configured to control the stepper motor in order to "point" the pointer at the set of markers to indicate a temperature value. For example, HVAC controller 30 may be configured to control the stepper motor in order to cause the pointer to indicate a first marker of the set of markers, wherein the first marker corresponds to a current temperature value. In some examples, HVAC controller 30 includes a temperature sensor. HVAC controller 30 may control the stepper motor to align the pointer with the first marker based on the information indicative of the current parameter value. A stepper motor divides a full rotation into a number of steps. It may be beneficial for the motor to divide the full rotation into steps so that the processing circuitry can control an amount in which the pointer rotates based on a number of steps in which the stepper motor rotates. The stepper motor may represent an electric motor.

Additionally, or alternatively, HVAC controller 30 may be configured to control dial 32 to indicate a temperature set point by indicating a second marker of the set of markers which corresponds to the temperature set point. In this way, it may be possible to observe the temperature set point and the current temperature value in relationship to each other on the same set of markers. Dial 32 may include a set of LEDs. In some examples, to control dial 32 to indicate the temperature set point, HVAC controller 30 may control the set of LEDs to indicate the second marker. HVAC controller 30 may indicate the second marker by illuminating an LED of the set of LEDs which is proximate to the second marker. In some examples, HVAC controller 30 may cause one or more LEDs proximate to the second marker to emit light that is a different color than light emitted by other LEDs on the dial. In any case, HVAC controller 30 may control the one or more LEDs to indicate the second marker. HVAC controller 30 may control the stepper motor in order to align the pointer with the first marker of the set of markers. That is, the pointer points at the first marker and the set of LEDs on the dial indicate the second marker.

In some examples, HVAC controller 30 includes a temperature sensor. HVAC controller 30 may control the stepper motor to align the pointer with the first marker based on the information indicative of the current temperature value. HVAC controller 30 may control the pointer to indicate the current temperature value in real time or near real time. That is, HVAC controller 30 may move the pointer in response to a change in the current temperature.

In some examples, HVAC controller receives a rotation input to dial 32. The rotation input may be a clockwise rotation input or a counter-clockwise rotation input. In some examples, when dial 32 receives the rotation input, the HVAC controller 30 is in a set point change mode. In this case, HVAC controller 30 may change one or more temperature set points based on receiving the rotation input. HVAC controller 30 may control the set of LEDs of dial 32 to indicate a marker of the set of markers based on the change in the temperature set point. For example, HVAC controller 30 may control the set of LEDs of dial 32 to update the marker of the set of markers indicated by the LEDs in response to receiving the rotation input. Alternatively, HVAC controller 30 may receive, from a user device of devices 8, a user selection of a temperature set point. HVAC controller may control the set of LEDs of dial 32 to indicate the second marker based on the user selection of the set point parameter value. In this way, HVAC controller 30 may control the temperature set points based on user selections via dial 32 and/or user selections via a wireless connection 41 to user devices 8.

Dial 32 may include dial circuitry that is configured to generate an electrical signal indicative of a rotation of dial 32. That is, HVAC controller 30 may be configured to determine any one or combination of a rotational position of dial 32, a rotational displacement of dial 32, and a rotational velocity of dial 32 based in the electrical signal generated by the dial circuitry.

HVAC controller 30 may include a communication device (not illustrated in FIG. 1) to allow HVAC controller 30 to communicate via a wired or wireless connection 40 to external computing device 36. The communication device may include a Bluetooth transmitter and receiver, a Wi-Fi transmitter and receiver, a Zigbee transceiver, a near-field communication transceiver, or other circuitry configured to allow HVAC controller 30 to communicate with external computing device 36. In some examples, the communication device may allow HVAC controller 30 to exchange data with external computing device 36. Examples of exchanged data include a desired temperature for building 12, HVAC component(s) 16 connected to HVAC controller 30, error codes, geographic location, estimated energy usage and cost, and/or other operating parameters or system performance characteristics for HVAC system 10.

HVAC controller 30 may communicate via wired or wireless connection 40 with external computing device 36. External computing device 36 may be, include, or otherwise be used in combination with a mobile phone, smartphone, tablet computer, personal computer, desktop computer, personal digital assistant, router, modem, remote server or cloud computing device, and/or related device allowing HVAC controller 30 to communicate over a communication network such as, for example, the Internet or other wired or wireless connection. Communicating via the wired or wireless connection 40 may allow HVAC controller 30 to be configured, controlled, or otherwise exchange data with external computing device 36. In some examples, HVAC controller 30 communicating via wired or wireless connection 40 may allow a user to set up HVAC controller 30 when first installing the controller in building 12. In some examples, HVAC controller 30 and external computing device 36 communicate through a wireless network device such as a router or a switch. In other examples, HVAC controller 30 and external computing device 36 communicate through a wired connection such as an ethernet port, USB connection, or other wired communication network.

HVAC controller 30 may, via the communication device, communicate via a wired or wireless connection 41 with external database 48. In some examples, wired or wireless connection 41 enables HVAC controller 30 to communicate with external database 48 via a wireless connection which includes a network device such as a router, ethernet port, or switch. HVAC controller 30 and external database 48 may also communicate through a wired connection such as an ethernet port, USB connection, or other wired communication network. Communicating via the wired or wireless connection 41 may allow HVAC controller 30 to exchange data with external database 48. As such, external database 48 may be at a location outside of building 12. In some examples, external database 48 may be, include, or otherwise be used in combination with a remote server, cloud computing device, or network of controllers configured to communicate with each other. For example, HVAC controller 30 may receive data from HVAC controllers in nearby buildings through the internet or other city- or wide-area network. HVAC controller 30 may include the onboard database because it is unable to communicate via the communication device.

In some examples, external database 48 may be, or otherwise be included in, or accessed via, external computing device 36 (e.g., smartphone, mobile phone, tablet computer, personal computer, etc.). For example, HVAC controller 30 may communicate via a Wi-Fi network connection with a smartphone device to exchange data with external database 48. By communicating via wired or wireless connection 41, HVAC controller 30 may exchange data with external database 48.

In some examples, HVAC controller 30 may display a setpoint as a bright white light at moving around a perimeter of HVAC controller 30. As dial 32 rotates, the light may move with dial 32 to show a selected setpoint. If the setpoint is changed via a mobile application on one or more of user devices 8, the light may move on HVAC controller 30 to show the selected setpoint. An application of one of user devices 8 may enable a user to view one or more aspects of HVAC controller 30.

In some examples, if a Buoy water valve is installed, HVAC controller 30 may receive details on water usage and leak status. In some examples, if a security system is installed, HVAC controller 30 may control the security system.

Figure 2:
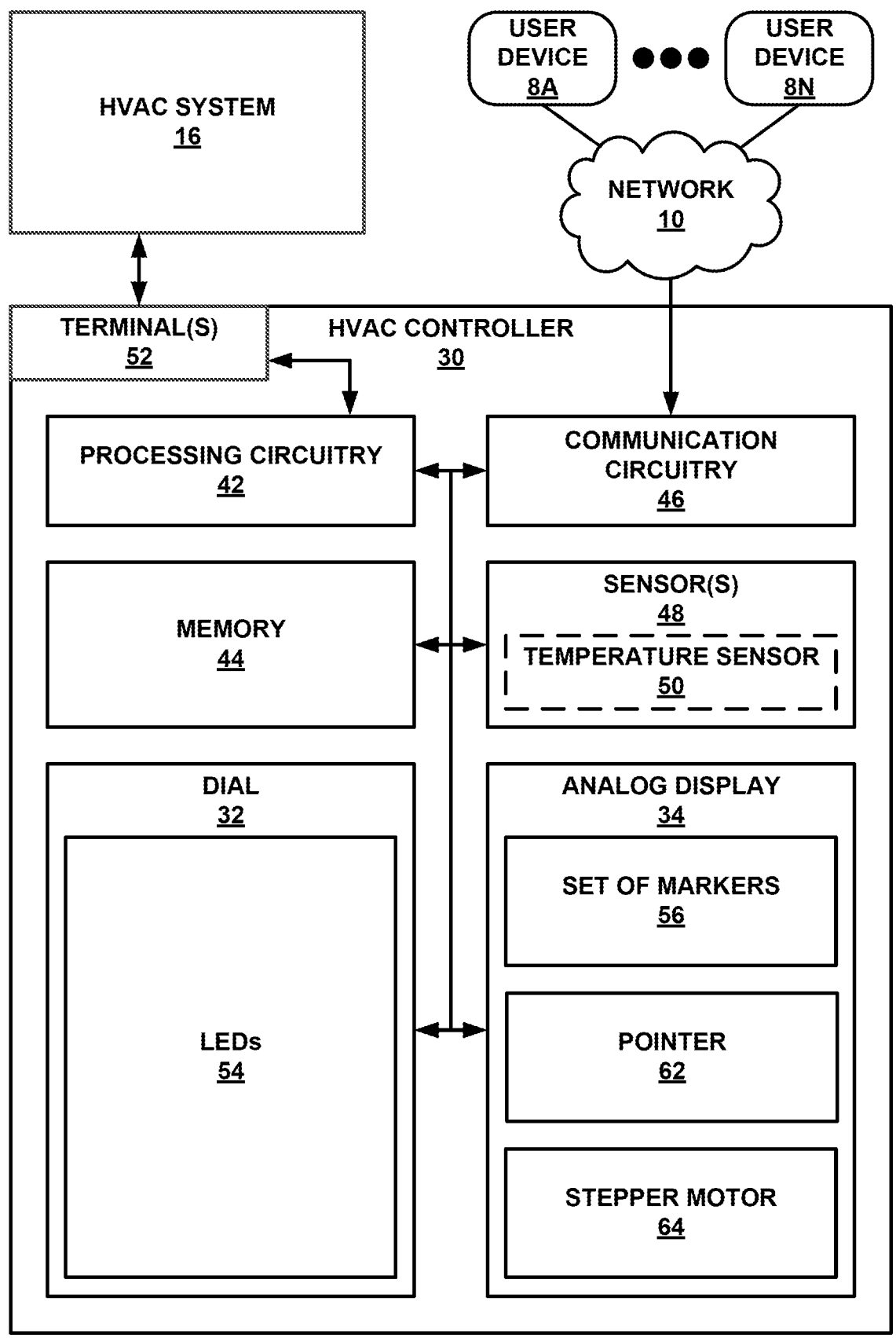
FIG. 2 is a block diagram illustrating an example HVAC controller including a dial and an analog display, in accordance with one or more techniques described herein.

FIG. 2 is a block diagram illustrating an example HVAC controller 30 including a dial 32 and an analog display 34, in accordance with one or more techniques described herein. As seen in FIG. 2, HVAC controller 30 includes processing circuitry 42, memory 44, communication circuitry 46, sensor(s) 48, and terminal(s) 52. Sensor(s) 48 may, in some examples, include a temperature sensor 50. In some examples, dial 32 includes LEDs 54. Analog display 34 includes markers 56, pointer 62, and stepper motor 64. In HVAC controller 30 may be configured to communicate with HVAC system 10 via terminal(s) 52 and/or communicate with user devices 8A-8N (collectively, "user devices 8") via network 6.

HVAC controller 30 may be configured to control HVAC system 10 in order to regulate one or more parameters of a space (e.g., a building, one or more rooms within a building, a large vehicle, or a vessel). In some examples, HVAC controller 30 regulates a temperature within the space. HVAC controller 30 may regulate the temperature of the space by using HVAC system 10 to decrease a temperature of the space if the current temperature of the space is greater than a first set point temperature and/or increase a temperature of the space using HVAC system 10 if the current temperature of the space is less than a second set point temperature. In some examples, the first set point temperature (e.g., a cooling set point temperature) is less than the second set point temperature (e.g., a heating set point temperature). In some examples, the first set point temperature is equal to the second set point temperature.

Processing circuitry 42 may include fixed function circuitry and/or programmable processing circuitry. Processing circuitry 42 may include any one or more of a microprocessor, a controller, a DSP, an ASIC, an FPGA, or equivalent discrete or analog logic circuitry. In some examples, processing circuitry 42 may include multiple components, such as any combination of one or more microprocessors, one or more controllers, one or more DSPs, one or more ASICs, or one or more FPGAs, as well as other discrete or integrated logic circuitry. The functions attributed to processing circuitry 42 herein may be embodied as software, firmware, hardware or any combination thereof.

In some examples, memory 44 includes computer-readable instructions that, when executed by processing circuitry 42, cause HVAC controller 30 and processing circuitry 42 to perform various functions attributed to HVAC controller 30 and processing circuitry 42 herein. Memory 44 may include any volatile, non-volatile, magnetic, optical, or electrical media, such as, for example, RAM, DRAM, SRAM, magnetic discs, optical discs, flash memories, or forms of EPROM or EEPROM. In some examples, the memory is used to store program instructions for execution by the processing circuitry of HVAC controller 30.

Communication circuitry 46 may include any suitable hardware, firmware, software or any combination thereof for communicating with another device, such as user devices 8 or other devices. Under the control of processing circuitry 42, communication circuitry 46 may receive downlink telemetry from, as well as send uplink telemetry to, one of user devices 8 or another device with the aid of an internal or external antenna. Communication circuitry 46 may include a Bluetooth transmitter and receiver, a Wi-Fi transmitter and receiver, a Zigbee transceiver, a near-field communication transceiver, or other circuitry configured to allow HVAC controller 30 to communicate with one or more remote devices such as user devices 8. In some examples, communication circuitry 46 may allow HVAC controller 30 to exchange data with external computing device 123 of FIG. 1. Examples of exchanged data include a desired temperature for the space, one or more control parameters for HVAC system 10, error codes, geographic location, estimated energy usage and cost, and/or other operating parameters or system performance characteristics for HVAC system 10.

In some examples, HVAC controller 30 includes one or more sensor(s) 48 including temperature sensor 50. In some examples, temperature sensor 50 is located within a housing of HVAC controller 30. In some examples, temperature sensor 50 is located remotely from HVAC controller 30 and may communicate with HVAC controller 30 via communication circuitry 46. For example, temperature sensor 50 may be located in the same room or the same area as HVAC controller 30 while being separate from HVAC controller 30 such that heat generated from components of HVAC controller 30 does not affect a temperature signal generated by temperature sensor 50. It may be beneficial for temperature sensor 50 to be located separately from HVAC controller 30 in order to obtain an accurate temperature reading. In some examples where temperature sensor 50 is located within the housing of HVAC controller 30, HVAC controller 30 may prevent components from affecting a temperature signal generated by temperature sensor 50. In some examples, at least a portion of the housing of HVAC controller 30 may include stainless steel and the housing may be coated with a material which hides fingerprints. In some examples, the term "housing" may be used herein to describe an outer surface of HVAC controller 30, including on outer surface of dial 32, an outer surface of analog display 34, and an outer face of HVAC controller 30 which is fixed to a wall or another surface.

In some examples, a housing of HVAC controller 30 may be substantially cylindrical in shape, and dial 32 may represent a ring-shaped piece that is located at an outer circumference of HVAC controller 30. In some examples, HVAC controller 30 includes a first face configured to be mounted on a plate which is fixed to a wall or another surface, a second face including a display, and a third face representing a side of HVAC controller 30, the third face extending around a circumference of HVAC controller 30. Dial 32 may include the third face of HVAC controller 30. In some examples, dial 32 is configured to rotate with respect to one or more other components of HVAC controller 30. For example, dial 32 is configured to rotate with respect to analog display 34. In some examples, dial 32 is configured to rotate in response to a user input. Dial 32 may be electrically connected to dial circuitry (not illustrated in FIG. 2) which may generate an electrical signal indicative of one or more rotational parameters (e.g., a rotational position, a rotational velocity, and/or a rotational acceleration) of dial 32. The dial circuitry may output the electrical signal indicative of the one or more rotational parameters to processing circuitry 42. In some examples, the dial circuitry is part of processing circuitry 42.

Processing circuitry 42 may be configured to set and/or change one or more temperature set points corresponding to the space in which HVAC controller 30 regulates temperature. For example, a first set point temperature may represent a cooling set point temperature and a second set point temperature may represent a heating set point temperature. In some examples, if HVAC controller 30 is cooling and the current temperature is greater than the cooling set point temperature, processing circuitry 42 may control HVAC system 10 to regulate the temperature in the space to approach the cooling set point temperature over a period of time based on the current temperature and the cooling set point temperature. In some examples, if HVAC controller 30 heating and the current temperature is less than the heating set point temperature, processing circuitry 42 may control HVAC system 10 to regulate the temperature in the space to approach the heating set point temperature over a period of time based on the current temperature and the heating set point temperature.

In some example, processing circuitry 42 is configured to receive an instruction to change and/or set one or more temperature set points of HVAC controller 30 from dial circuitry electrically connected to dial 32, where the instruction is indicative of a user selection of one or more temperature set points using dial 32. For example, in response to a rotation of dial 32, processing circuitry 42 may set a temperature set point to a first temperature value. In response to a second rotation of dial 32, processing circuitry 42 may set the temperature set point to a second temperature value. In some examples, processing circuitry 42 is configured to receive an instruction to change and/or set one or more temperature set points of HVAC controller 30 from one or more of user devices 8 via network 6. Processing circuitry 42 may change the one or more temperature set points based on such an instruction.

In some examples, dial 32 includes LEDs 54. LEDs 54 may be, in some cases, a part of dial 32. In some examples, each LED of LEDs 54 may be configured to output an optical signal. LEDs 54 may be arranged in an array around the circumference of dial 32 such that the optical signal output by each LED of LEDs 54 is emitted outwards from a face of HVAC controller 30 which includes analog display 34. In some examples, processing circuitry 42 is configured to cause at least some of LEDs 54 to output an optical signal of a first color when HVAC controller 30 is in a heating set point mode and the current temperature is lower than the heating set point temperature. In some examples, processing circuitry 42 is configured to cause at least some of LEDs 54 to output an optical signal of a second color when HVAC controller 30 is in a cooling set point mode and the current temperature is greater than the cooling set point temperature. In some examples, the first color is red, and the second color is blue, but this is not required. Each of the first color and the second color may represent any visible wavelength of light.

In some examples, markers 56 may include a set of temperature markers. The set of temperature markers may represent a range of temperatures. In some examples, the range of temperatures includes a lower-bound temperature and an upper-bound temperature. In some examples, the lower-bound temperature is 40 degrees Fahrenheit (° F.) and the upper-bound temperature is 90° F., but this is not required. The range of temperatures may include any range of temperatures. In some examples, each temperature marker of the set of temperature markers is in the shape of a dash, or a line. The set of temperature markers may be arranged in a semi-circular array where the set of temperature markers are equally spaced apart. In some examples, markers 56 may include a set of numeric temperature indicators. Each numeric temperature indicator of the set of numeric temperature indicators may indicate a temperature associated with a respective temperature marker of the set of temperature markers.

Pointer 62 may extend along a radius of analog display 34 and pointer 62 may be configured to rotate about a center point of analog display 34 such that pointer 62 "points" at one or more markers of the set of markers 56. In some examples, stepper motor 64 may receive an electric signal from processing circuitry 42 which causes stepper motor 64 to place pointer 62 in order to indicate a current temperature of the space in which HVAC controller 30 is performing temperature regulation using HVAC components 16. In some examples, processing circuitry 42 receives a temperature signal from temperature sensor 50, the temperature signal indicating the current temperature of the space in real-time or near real-time. Processing circuitry 42 may cause stepper motor 64 to place (e.g., rotate) the pointer 62 based on the temperature signal in order to indicate the current temperature by pointing pointer 62 at a marker of the set of markers 56 which corresponds to the current temperature. In this way, pointer 62 may point at a marker of the set of markers 56 to indicate the current temperature of space, and LEDs 54 may indicate one or more markers of the set of markers 56 to indicate one or more respective temperature set points for controlling HVAC components 16 to regulate the temperature within the space. The stepper motor may represent an electric motor.

Figure 3A:
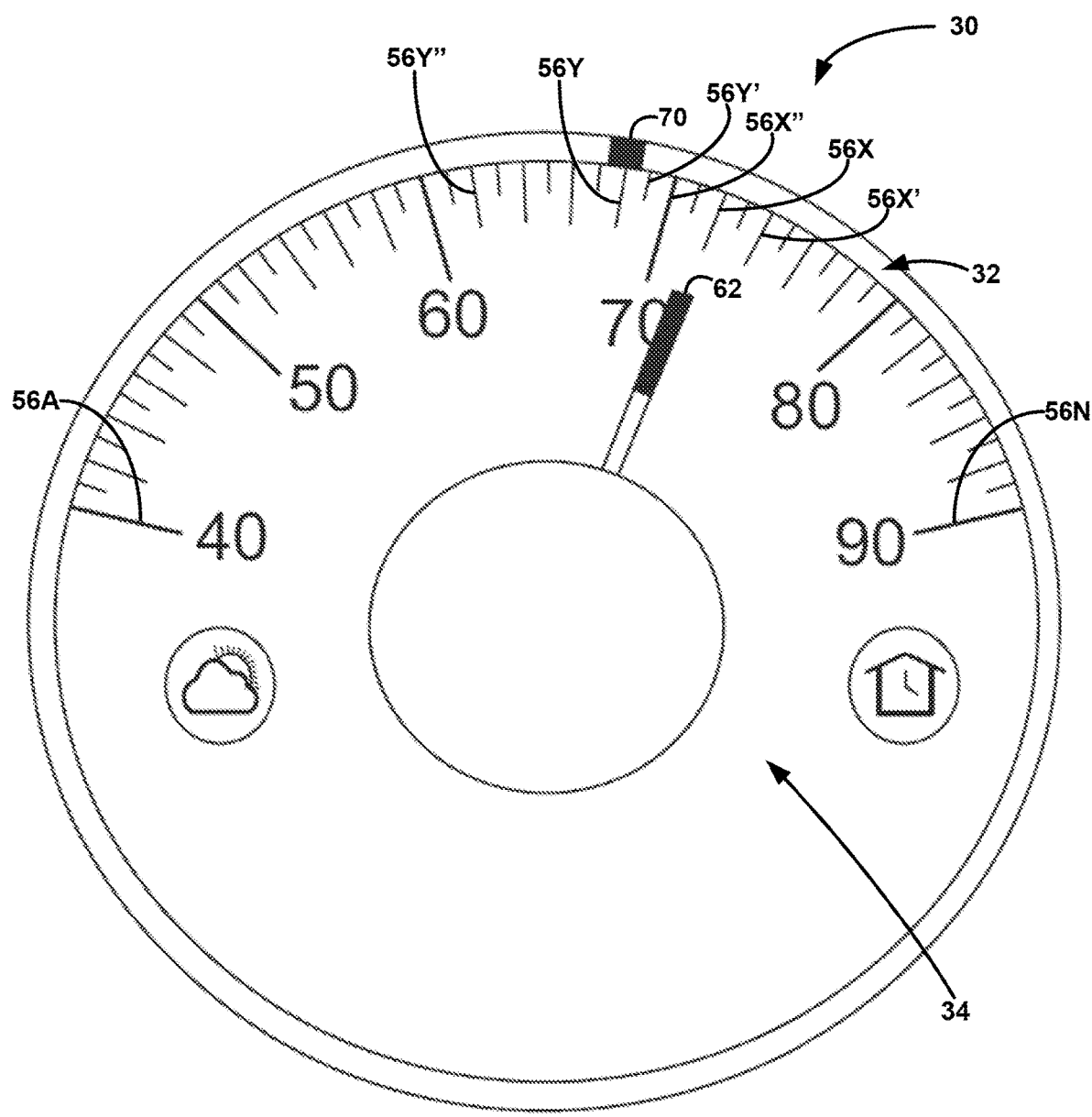
FIG. 3A is a conceptual diagram illustrating the HVAC controller of FIG. 2 operating in a first configuration, in accordance with one or more techniques described herein.

FIG. 3A is a conceptual diagram illustrating HVAC controller 30 operating in a first configuration, in accordance with one or more techniques described herein. The HVAC controller 30 includes dial 32 and analog display 34. Dial 32 includes a set of LEDs (e.g., LEDs 54 of FIG. 2). The set of LEDs may include one or more LED(s) 70 which indicate a marker on analog display 34. Analog display 34 includes a pointer 62 and a set of markers 56A-56N (collectively, "markers 56"). The set of markers 56 include marker 56X and marker 56Y. Marker 56X represents the marker of the set of markers 56 which pointer 62 indicates and marker 56Y represents the marker of the set of markers 56 which LED(s) 70 indicate. Pointer 62 may be connected to a stepper motor (e.g., stepper motor 64 of FIG. 2). The form factor and design shown in FIG. 3A for HVAC controller 30 is not necessarily the only form that HVAC controller 30 may take. The techniques described herein with respect to HVAC controller 30 may be implemented in other devices with different forms and designs.

Markers 56 correspond to a range of temperatures extending from 40° F. to 90° F., although this range of temperatures is not meant to be limiting. The set of markers 56 include marker 56X which is indicated by pointer 62, and the set of markers 56 include marker 56Y, which is indicated by LED(s) 70. In some examples, the range of temperatures may include any range of temperatures according to any unit of measurement (Fahrenheit, Celsius, Kelvin or any combination thereof). Analog display 34 includes pointer 62 which is configured to point at one or more markers of the set of markers 56. In the example of FIG. 3A, pointer 62 is pointing at marker 56X. Marker 56X corresponds to a temperature of 72° F. Consequently, in the example of FIG. 3A, HVAC controller 30 is indicating that a current temperature within building 12 is approximately 72° F.

In the example of FIG. 3A, analog display 34 represents a circular display, and dial 32 represents a circular dial which is located at an outer circumference of analog display 34. FIG. 3A represents a front view of HVAC controller 30, meaning that a front face of dial 32 and a front face of analog display 34 are visible in FIG. 3A. Dial 32 is a rotatable dial. In other words, dial 32 may rotate clockwise or rotate counterclockwise while the front face analog display 34 remains fixed in position.

Pointer 62 is rotatable. For example, the stepper motor (e.g., stepper motor 64 of FIG. 2) is configured to rotate pointer 62 about a center point of analog display 34 in order to point pointer 62 at a marker of the set of markers 56 that corresponds, for example, to the determined current temperature. Pointer 62 extends along a radius of the front face of HVAC controller 30. That is, a longitudinal axis of pointer 62 passes through the center of the front face of HVAC controller 30. The stepper motor may rotate pointer 62 in order to indicate any of the set of markers 56. For example, if the current temperature within building 12 increases from 72° F. to 74° F., HVAC controller 30 may control the stepper motor to rotate pointer 62 clockwise so that pointer 62 points at marker 56X'. Alternatively, if the current temperature within building 12 decreases from 72° F. to 70° F., HVAC controller 30 may control the stepper motor to rotate pointer 62 clockwise so that pointer 62 points at marker 56X". In some examples, HVAC controller 30 prevents pointer 62 from rotating counterclockwise past marker 56A and prevents pointer 62 from rotating clockwise past marker 56N.

In some examples, it may be beneficial for pointer 62 to be connected to a stepper motor so that HVAC controller 30 may more accurately convey a current temperature as compared with, for example, HVAC controllers that convey the current temperature using a pointer that is controlled by a bi-metallic mechanical device. Compared with typical bi-metallic mechanical devices, an HVAC controller utilizing a stepper motor in the manner described herein may achieve a better match between a displayed current temperature and a setpoint at which the controller begins cooling or heating, or other HVAC functionality. Stepper motor 64 may allow HVAC controller 30 to indicate other information besides temperature. For example, HVAC controller 30 may indicate one or more configurations (e.g., operating modes) by controlling stepper motor 64.

In some examples, each LED of the set of LEDs (e.g., LEDs 54 of FIG. 2) on the dial 32 is configured to output an optical signal. Processing circuitry 42 is configured to selectively illuminate individual LEDs or groups of LEDs in order to indicate one or more set point temperatures. As seen in FIG. 3A, LED(s) 70 are illuminated, where LED(s) 70 are proximate marker 56Y. Marker 56Y corresponds to a temperature of 68° F. As such, in the example of FIG. 3A, HVAC controller 30 indicates that a set point temperature is 68° F. Since the set point temperature of 68° F. is lower than the current temperature of approximately 72° F., HVAC controller 30 may control HVAC component(s) 16 to cause the temperature within building 12 to decrease to the set point temperature over a period of time. That is, in the example of FIG. 3A, HVAC controller 30 may be in a "cooling" mode. In some examples, one or more of the set of LEDs on dial 32 output an optical signal of a first color, where the first color corresponds to a cooling mode of HVAC controller 30. In some examples, the one or more of the set of LEDs of dial 32 which output the optical signal of the first color do not include LED(s) 70, which indicate the set point temperature. As such, a color of an optical signal emitted by LED(s) 70 may be different than the first color. In some examples, the first color is blue.

In response to a change in the set point temperature from 68° F. to 69° F., HVAC controller 30 transition the set of LEDs on dial 32 from indicating marker 56Y to indicating marker 56Y'. In some examples, HVAC controller 30 may change the set point temperature from 68° F. to 69° F. in response to a clockwise rotational input to dial 32. In some examples, HVAC controller 30 may change the set point temperature from 68° F. to 69° F. in response to receiving a user input from a user device.

Alternatively, in response to a change in the set point temperature from 68° F. to 62° F., HVAC controller 30 transition the set of LEDs on dial 32 from indicating marker 56Y to indicating marker 56Y". In some examples, HVAC controller 30 may change the set point temperature from 68° F. to 62° F. in response to a counterclockwise rotational input to dial 32. In some examples, HVAC controller 30 may change the set point temperature from 68° F. to 62° F. in response to receiving a user input from a user device.

Figure 3B:
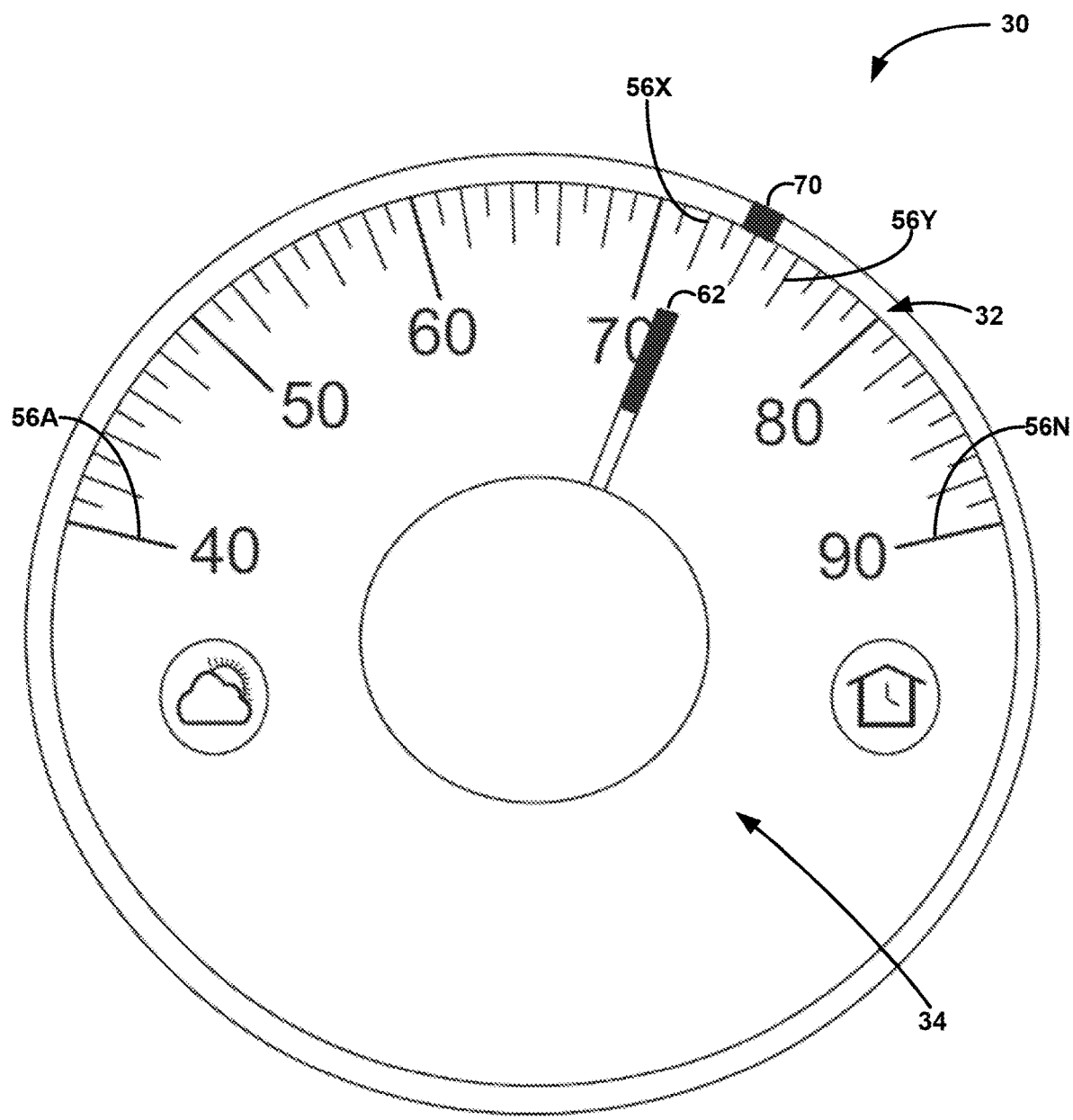
FIG. 3B is a conceptual diagram illustrating the HVAC controller of FIG. 2 operating in a second configuration, in accordance with one or more techniques described herein.

FIG. 3B is a conceptual diagram illustrating HVAC controller 30 operating in a second configuration, in accordance with one or more techniques described herein. In some examples, the HVAC controller 30 of FIG. 3B is substantially the same as the HVAC controller 30 of FIG. 3A except that a set point temperature of the HVAC controller 30 of FIG. 3B is different than the set point temperature of the HVAC controller 30 of FIG. 3A. For example, as seen in FIG. 3B, LED(s) 70 indicate marker 56Y, which corresponds to a temperature of 74° F. As such, in the example of FIG. 3B, HVAC controller 30 indicates that the set point temperature is 74° F. Since the set point temperature of 74° F. is greater than the current temperature of approximately 72° F., HVAC controller 30 may control HVAC component(s) 16 to cause the temperature within building 12 to increase to the set point temperature over a period of time. In some examples, one or more of the set of LEDs of dial 32 output an optical signal of a second color, where the second color corresponds to a heating mode of HVAC controller 30. In some examples, the one or more of the set of LEDs of dial 32 which output the optical signal of the second color do not include LED(s) 70, which indicate the set point temperature. As such, a color of an optical signal emitted by LED(s) 70 may be different than the second color. In some examples, the second color is red. In this way, when HVAC controller 30 is in a cooling mode, dial 32 may emit blue light and when HVAC controller 30 is in a heating mode, dial 32 may emit red light.

Figure 4A:
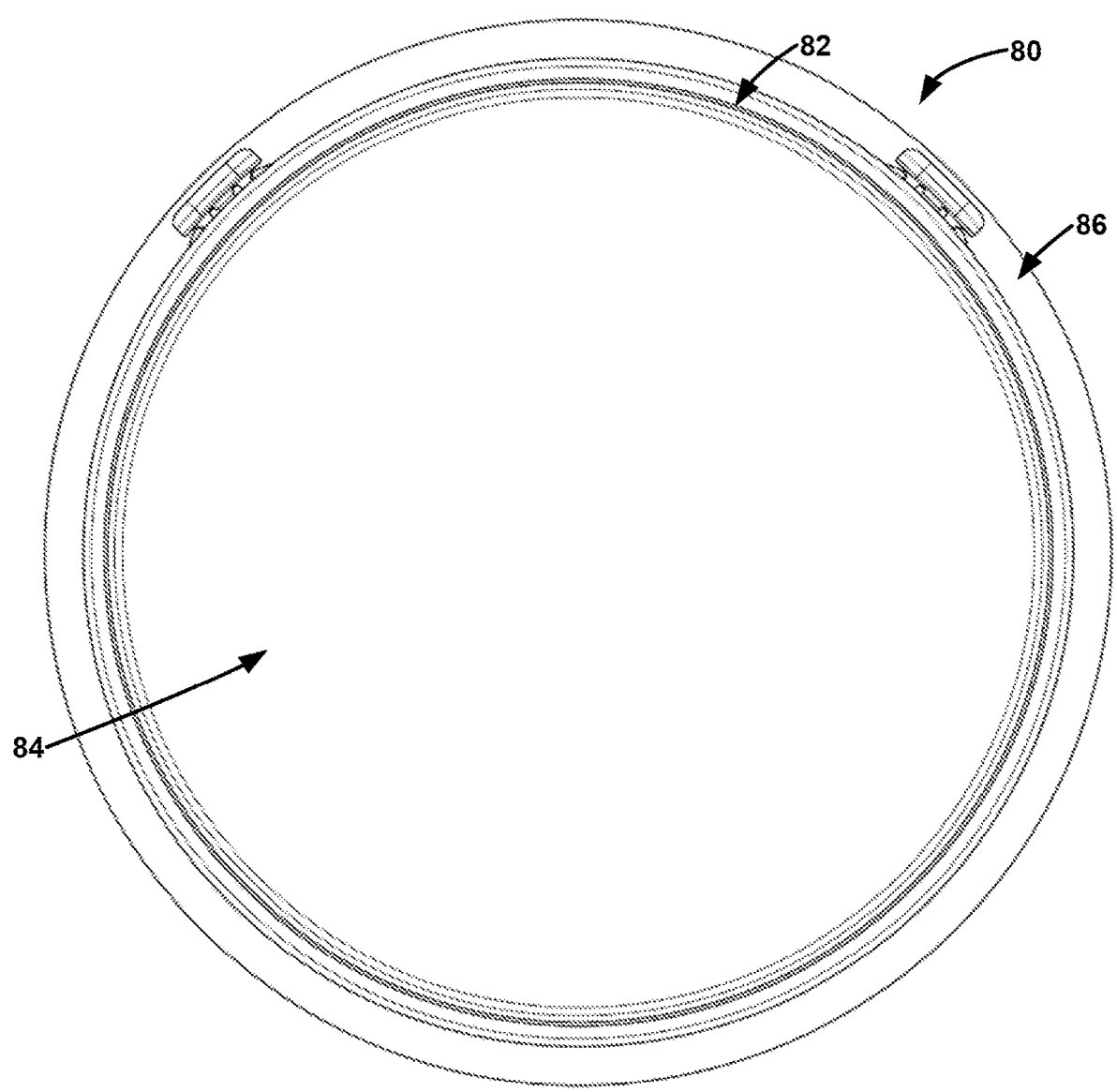
FIG. 4A is a conceptual diagram illustrating a front view of an HVAC controller, in accordance with one or more techniques described herein.

FIG. 4A is a conceptual diagram illustrating a front view of an HVAC controller 80, in accordance with one or more techniques described herein. As seen in FIG. 4A, HVAC controller 80 includes dial 82, analog display 84, and wall plate 86. HVAC controller 80 of FIG. 4A may be an example of HVAC controller 30 of FIGS. 1-3B. Dial 82 may be an example of dial 32 of FIGS. 1-3B. Analog display 84 may be an example of analog display 34 of FIGS. 1-3B.

Dial 82 may represent a rotatable dial which is located at an outer circumference of analog display 84. For example, dial 82 may rotate about a center of HVAC controller 80 while a surface of analog display 84 remains fixed in place. That is, when dial 82 rotates about the center of HVAC controller 80, the surface of analog display 84 and the wall plate 86 do not rotate. Dial 82 is configured to rotate clockwise and rotate counterclockwise. HVAC controller 80 may control one or more temperature set points based on rotation inputs to dial 82. For example, HVAC controller 80 may increase one or more temperature set points responsive to receiving a clockwise rotation input and HVAC controller 80 may decrease one or more temperature set points responsive to receiving a counterclockwise rotation input. HVAC controller 80 may control one or more other parameters based on rotation inputs to dial 82. For example, HVAC controller 80 may control one or more modes of operation, control one or more humidity set points, or control one or more other set points responsive to rotation inputs to dial 82. Although analog display 84 is blank in FIG. 4A, analog display 84 may include the components of FIGS. 3A-3B. That is, analog display 84 may include pointer 62 and markers 56, even though pointer 62 and markers 56 are not illustrated in FIG. 4A.

Figure 4B:
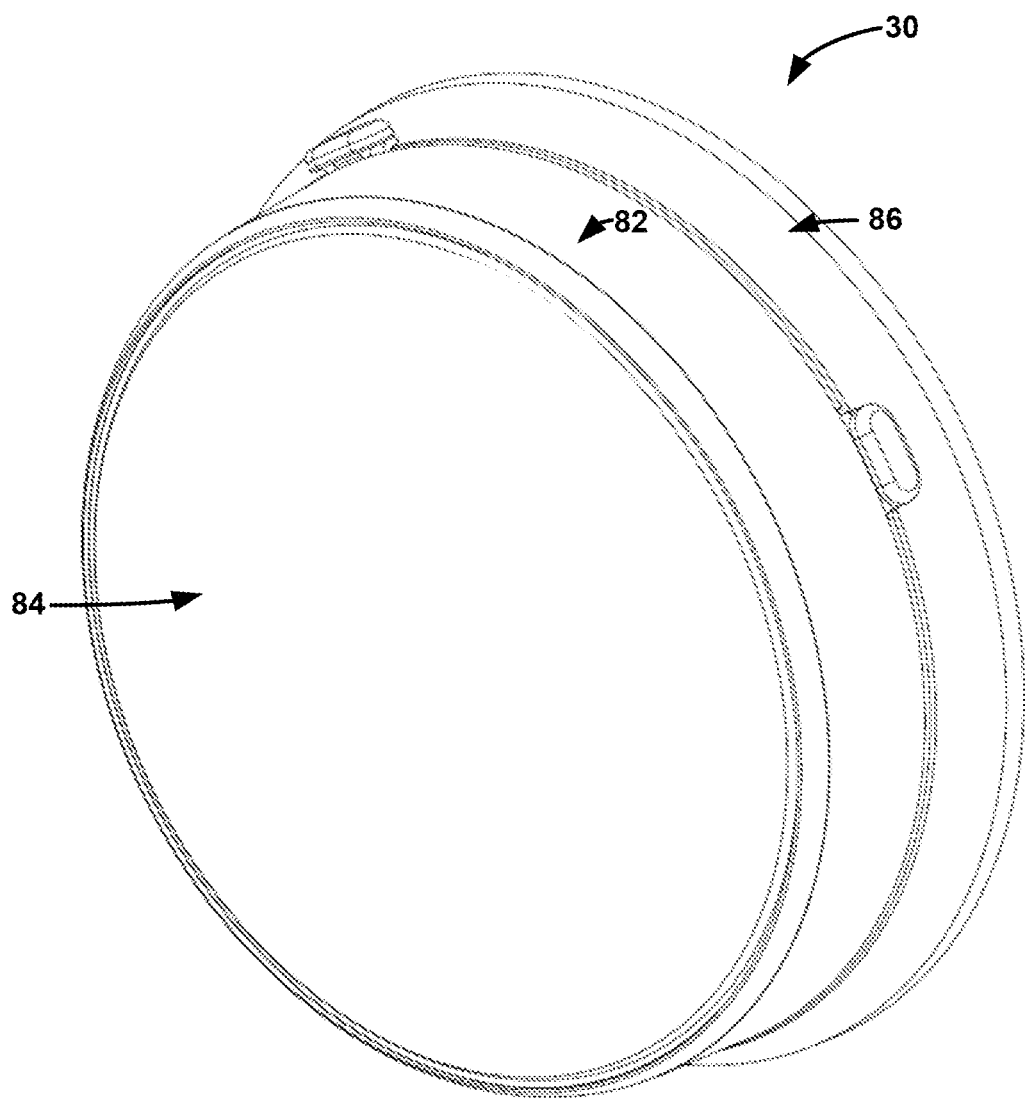
FIG. 4B is a conceptual diagram illustrating a perspective view of the HVAC controller of FIG. 4A, in accordance with one or more techniques described herein.

FIG. 4B is a conceptual diagram illustrating a perspective view of the HVAC controller 80 of FIG. 4A, in accordance with one or more techniques described herein. As seen in FIG. 4B, a front face of controller 80 includes a front face of dial 82 and analog display 84. Dial 82 is substantially cylindrical in shape. Dial 82 is configured to rotate while analog display 84 and wall plate 86 remain fixed in place.

Figure 5:
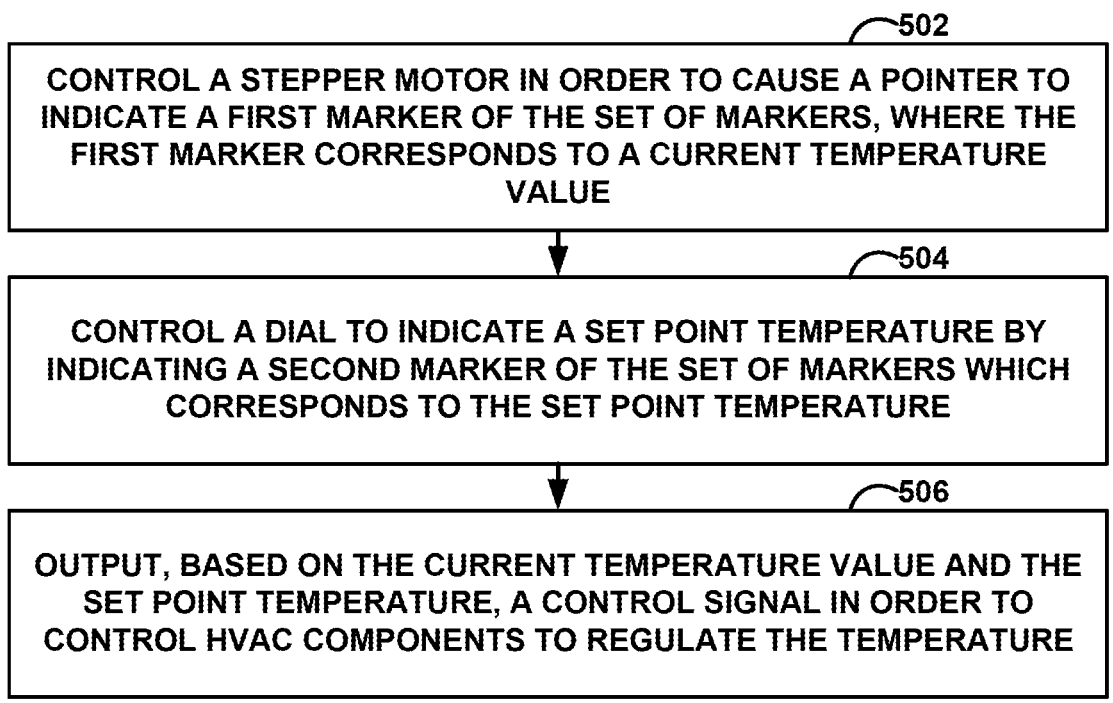
FIG. 5 is a flow diagram illustrating an example operation for controlling an HVAC controller, in accordance with one or more techniques described herein.

FIG. 5 is a flow diagram illustrating an example operation for controlling an HVAC controller, in accordance with one or more techniques described herein. FIG. 5 is described with respect to HVAC controller 30 and HVAC component(s) 16 of FIGS. 1-2. However, the techniques of FIG. 5 may be performed by different components of HVAC controller 30 and HVAC component(s) 16 or by additional or alternative devices.

Processing circuitry 42 may be configured to control stepper motor 64 in order to cause pointer 62 to indicate a first marker of the set of markers 56, where the first marker corresponds to a current temperature value (502). In some examples, the current temperature value is a temperature in an area in which HVAC controller 30 is located. Processing circuitry 42 is configured to control dial 32 to indicate a set point temperature by indicating a second marker of the set of markers 56 which corresponds to the set point temperature (504). In this way, HVAC controller 30 is configured to indicate the current temperature and the set point temperature on the same set of markers 56. This may allow a user to view the current temperature relative to the set point temperature on the face of HVAC controller 30.

In some examples, processing circuitry 42 is configured to output, based on the current temperature value and the set point temperature value, a control signal in order to control HVAC components to regulate the temperature (506) within building 12. For example, if the current temperature is lower than the set point temperature, HVAC controller 30 may control HVAC components 16 to increase the current temperature, and if the current temperature is greater than the set point temperature, HVAC controller 30 may control HVAC components 16 to decrease the current temperature.

The following examples are example systems, devices, and methods described herein.

Example 1: A device for controlling a heating, ventilation, and air conditioning (HVAC) system within a building. The device includes an analog display comprising a set of markers, a stepper motor, and a pointer connected to the stepper motor. The device further includes processing circuitry configured to: control the stepper motor in order to cause the pointer to indicate a first marker of the set of markers, wherein the first marker corresponds to a current parameter value; and control a dial to indicate a set point parameter value by indicating a second marker of the set of markers which corresponds to the set point parameter value.

Example 2: The device of example 1, wherein the dial comprises a set of LEDs, and wherein the processing circuitry is further configured to: compare the set point parameter value with the current parameter value; cause, if the set point parameter value is lower than the current parameter value, the set of LEDs to output a first optical signal representing a first color; and cause, if the set point parameter value is not lower than the current parameter value, an instruction for the set of LEDs to output a second optical signal representing a second color.

Example 3: The device of any of examples 1-2, wherein to control the dial to indicate the set point parameter value, the processing circuitry is configured to control a set of LEDs to indicate the second marker, and wherein to control the stepper motor, the processing circuitry is configured to control the stepper motor to align the pointer with the first marker.

Example 4: The device of example 3, wherein the processing circuitry is further configured to: receive, from a temperature sensor, information indicative of the current parameter value; and control the stepper motor to align the pointer with the marker of the set of markers which corresponds to the current parameter value based on the information indicative of the current parameter value.

Example 5: The device of any of examples 3-4, wherein the processing circuitry is further configured to: receive a rotation input to the dial, wherein the rotation input represents a user selection of the set point parameter value; and cause the dial to control the set of LEDs to indicate the second marker based on the user selection of the set point parameter value.

Example 6: The device of example 5, wherein the dial is located at an outer circumference of the device, and wherein the dial comprises dial circuitry configured to: generate an electrical signal including information indicative of the rotation input based on one or both of a rotational position of the circular knob or a rotational movement of the circular knob; and output the electrical signal to the processing circuitry.

Example 7: The device of any of examples 3-6, wherein the processing circuitry is further configured to: receive, from a remote device, a user selection of the set point parameter value; and cause the dial to control the set of LEDs to indicate the second marker based on the user selection of the set point parameter value.

Example 8: The device of any of examples 1-7, wherein the processing circuitry is configured to control, based on the current parameter value and the set point parameter value, the HVAC system to regulate the parameter value to be substantially equal to the set point parameter value.

Example 9: The device of example 8, wherein to control the HVAC system, the processing circuitry is configured to control, based on the current parameter value being lower than the set point parameter value, the HVAC system to increment the current parameter value over a period of time.

Example 10: The device of any of examples 8-9, wherein to control the HVAC system, the processing circuitry is configured to control, based on the current parameter value being greater than the set point parameter value, the HVAC system to decrement the current parameter value over a period of time.

Example 11: The device of any of examples 1-10, wherein the device comprises a substantially circular shape including a circumference, wherein the dial is located at an outer circumference of the device, wherein the set of markers extend at least partially around the circumference and are closer to a center of the circular shape than the dial, wherein the pointer is closer to the center of the circular shape than the dial and the set of markers.

Example 12: The device of any of examples 1-11, wherein the parameter value represents a temperature value, wherein the set point parameter value represents a set point temperature, and wherein the current parameter value represents a current temperature within the building.

Example 13: A method comprising: controlling, by processing circuitry of a device for controlling a heating, ventilation, and air conditioning (HVAC) system within a building, a stepper motor in order to cause a pointer to indicate a first marker of a set of markers, wherein an analog display comprises the set of markers, and wherein the first marker corresponds to a current parameter value; and controlling, by the processing circuitry, a dial to indicate a set point parameter value by indicating a second marker of the set of markers which corresponds to the set point parameter value.

Example 14: The method of example 13, wherein the dial comprises a set of LEDs, and wherein the method further comprises: comparing, by the processing circuitry, the set point parameter value with the current parameter value; causing, by the processing circuitry if the set point parameter value is lower than the current parameter value, the set of LEDs to output a first optical signal representing a first color; and causing, by the processing circuitry if the set point parameter value is not lower than the current parameter value, an instruction for the set of LEDs to output a second optical signal representing a second color.

Example 15: The method of any of examples 13-14, wherein controlling the dial to indicate the set point parameter value comprises controlling a set of LEDs to indicate the second marker, and wherein controlling the stepper motor comprises controlling the stepper motor to align the pointer with the first marker.

Example 16: The method of example 15, wherein the method further comprises: receiving, by the processing circuitry from a temperature sensor, information indicative of the current parameter value; and controlling, by the processing circuitry, the stepper motor to align the pointer with the marker of the set of markers which corresponds to the current parameter value based on the information indicative of the current parameter value.

Example 17: The method of any of examples 15-16, wherein the method further comprises: receiving, by the processing circuitry, a rotation input to the dial, wherein the rotation input represents a user selection of the set point parameter value; and causing, by the processing circuitry, the dial to control the set of LEDs to indicate the second marker based on the user selection of the set point parameter value.

Example 18: The method of example 17, wherein the dial is located at an outer circumference of the device, and wherein the method further comprises: generating, by dial circuitry of the dial, an electrical signal including information indicative of the rotation input based on one or both of a rotational position of the circular knob or a rotational movement of the circular knob; and outputting, by the dial circuitry, the electrical signal to the processing circuitry.

Example 19: The method of any of examples 15-18, wherein the method further comprises: receiving, by the processing circuitry from a remote device, a user selection of the set point parameter value; and causing, by the processing circuitry, the dial to control the set of LEDs to indicate the second marker based on the user selection of the set point parameter value.

Example 20: A device for controlling a heating, ventilation, and air conditioning (HVAC) system within a building, the device comprising: an analog display comprising: a set of markers; a stepper motor; and a pointer connected to the stepper motor; and processing circuitry configured to: control the stepper motor in order to cause the pointer to indicate a first marker of the set of markers, wherein the first marker corresponds to a current parameter value; and control a dial to indicate a set point parameter value by indicating a second marker of the set of markers which corresponds to the set point parameter value.

Example 21: A device for controlling a heating, ventilation, and air conditioning (HVAC) system within a building, the device comprising: an analog display comprising a set of markers, and wherein each marker of the set of markers corresponds to a respective parameter value of a parameter associated with the building; an electrical motor; a pointer connected to the electrical motor; a set point control device; and processing circuitry configured to: control, by outputting a signal to the electrical motor, the pointer to indicate a first marker of the set of markers which corresponds to a current parameter value of the parameter; and output information indicative of an instruction for the set point control device to display a set point parameter value by indicating a second marker of the set of markers which corresponds to the set point parameter value of the parameter.

Example 22: The device of example 21, wherein to output the information indicative of the instruction for the set point control device to display the set point parameter value, the processing circuitry is configured to: output an instruction causing the set point control device to activate a light-emitting diode (LED) of a set of LEDs which is proximate to a marker of the set of markers corresponding to the set point parameter value, and wherein to control the pointer, the processing circuitry is configured to: control the electrical motor to align the pointer with the marker of the set of markers which corresponds to the current parameter value of the parameter.

Example 23: The device of any of examples 21-22, wherein the set point control device comprises the set of LEDs, and wherein the processing circuitry is further configured to: determine whether the set point parameter value is lower than the current parameter value; output, if the set point parameter value is lower than the current parameter value, an instruction for at least some of the set of LEDs to output a first optical signal representing a first color; and output, if the set point parameter value is not lower than the current parameter value, an instruction for at least some of the set of LEDs to output a second optical signal representing a second color.

Example 24: The device of any of examples 22-23, wherein the processing circuitry is further configured to: receive, from a temperature sensor, information indicative of the current parameter value; and control the electrical motor to align the pointer with the marker of the set of markers which corresponds to the current parameter value based on the information indicative of the current parameter value.

Example 25: The device of any of examples 22-24, wherein the processing circuitry is further configured to: receive, from the set point control device, information indicative of a user selection of the set point parameter value; and output the instruction causing the set point control device to activate the LED based on the information indicative of the user selection of the set point parameter value.

Example 26: The device of example 25, wherein the set point control device comprises a circular knob located at an outer circumference of the device, and wherein the set point control device is configured to: generate an electrical signal including the information indicative of a user selection of the set point parameter value based on one or both of a rotational position of the circular knob relative to the analog display or a rotational movement of the circular knob relative to the analog display; and output the electrical signal to the processing circuitry.

Example 27: The device of any of examples 22-26, wherein the processing circuitry is further configured to: receive, from a remote device, information indicative of a user selection of the set point parameter value; and output the instruction causing the set point control device to activate the LED based on the information indicative of the user selection of the set point parameter value.

Example 28: The device of any of examples 22-27, wherein the electrical motor represents a stepper motor.

Example 29: The device of any of examples 22-28, wherein the processing circuitry is configured to: output, based on the current parameter value and the set point parameter value, a control signal in order to control the HVAC system Example 30: The device of example 29, wherein to control the HVAC system, the processing circuitry is configured to: output, based on the current parameter value being lower than the set point parameter value, the control signal in order to cause the HVAC system to increment the current parameter value over a period of time.

Example 31: The device of any of examples 29-30, wherein to control the HVAC system, the processing circuitry is configured to: output, based on the current parameter value being greater than the set point parameter value, the control signal in order to cause the HVAC system to decrement the current parameter value over a period of time.

Example 32: The device of any of examples 20-31, wherein the device comprises a substantially circular shape including a circumference, wherein the set point control device comprises a round dial located at an outer circumference of the device, wherein the set of markers extend at least partially around the circumference and are closer to a center of the circular shape than the set point control device, wherein the pointer is closer to the center of the circular shape than the set point control device and the set of markers.

Example 33: The device of any of examples 20-32, wherein the parameter represents a temperature, wherein the set point parameter value represents a set point temperature, and wherein the current parameter value represents a current temperature within the building.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor" or "processing circuitry," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Various examples have been described. These and other examples are within the scope of the following claims.

What is claimed is:

1. A device for controlling a heating, ventilation, and air conditioning (HVAC) system within a building, the device comprising:
    an analog display comprising:
        a set of markers;
        a stepper motor; and
        a rotatable pointer connected to the stepper motor, wherein the rotatable pointer is configured to:
            extend along a radius of the analog display;
            extend from a center point toward the set of markers; and
            rotate about the center point of the analog display; and
    a processing circuitry configured to:
        control the stepper motor in order to cause the rotatable pointer to indicate a first marker of the set of markers, wherein the first marker corresponds to a current parameter value; and
        control a dial to indicate a set point parameter value by indicating a second marker of the set of markers which corresponds to the set point parameter value.

2. The device of claim 1, wherein the dial comprises a set of LEDs, and wherein the processing circuitry is further configured to:
    compare the set point parameter value with the current parameter value;
    cause, if the set point parameter value is lower than the current parameter value, the set of LEDs to output a first optical signal representing a first color; and
    cause, if the set point parameter value is not lower than the current parameter value, an instruction for the set of LEDs to output a second optical signal representing a second color.

3. The device of claim 1,
    wherein to control the dial to indicate the set point parameter value, the processing circuitry is configured to control a set of LEDs to indicate the second marker,
    wherein to control the stepper motor, the processing circuitry is configured to control the stepper motor to align the rotatable pointer with the first marker.

4. The device of claim 3, wherein the processing circuitry is further configured to:
    receive, from a temperature sensor, information indicative of the current parameter value; and
    control the stepper motor to align the rotatable pointer with the first marker of the set of markers which corresponds to the current parameter value based on the information indicative of the current parameter value.

5. The device of claim 3, wherein the processing circuitry is further configured to:
    receive a rotation input to the dial, wherein the rotation input represents a user selection of the set point parameter value; and
    cause the dial to control the set of LEDs to indicate the second marker based on the user selection of the set point parameter value.

6. The device of claim 5, wherein the dial is located at an outer circumference of the device, and wherein the dial comprises dial circuitry configured to:
    generate an electrical signal including information indicative of the rotation input based on one or both of a rotational position of a circular knob or a rotational movement of the circular knob; and
    output the electrical signal to the processing circuitry.

7. The device of claim 3, wherein the processing circuitry is further configured to:
    receive, from a remote device, a user selection of the set point parameter value; and
    cause the dial to control the set of LEDs to indicate the second marker based on the user selection of the set point parameter value.

8. The device of claim 1, wherein the processing circuitry is configured to control, based on the current parameter value and the set point parameter value, the HVAC system to regulate the current parameter value to be substantially equal to the set point parameter value.

9. The device of claim 8, wherein to control the HVAC system, the processing circuitry is configured to control, based on the current parameter value being lower than the set point parameter value, the HVAC system to increment the current parameter value over a period of time.

10. The device of claim 8, wherein to control the HVAC system, the processing circuitry is configured to control, based on the current parameter value being greater than the set point parameter value, the HVAC system to decrement the current parameter value over a period of time.

11. The device of claim 1, wherein the device comprises a substantially circular shape including a circumference, wherein the dial is located at an outer circumference of the device, wherein the set of markers extend at least partially around the circumference and are closer to a center of the substantially circular shape than the dial, wherein the rotatable pointer is closer to the center of the substantially circular shape than the dial and the set of markers.

12. The device of claim 1, wherein the current parameter value represents a temperature value, wherein the set point parameter value represents a set point temperature, and wherein the current parameter value represents a current temperature within the building.

13. A method comprising:
    controlling, by a processing circuitry of a device for controlling a heating, ventilation, and air conditioning (HVAC) system within a building, a stepper motor in order to cause a rotatable pointer to indicate a first marker of a set of markers,
    wherein the rotatable pointer is configured to:
        extend along a radius of an analog display,
            wherein the analog display comprises the set of markers,
            wherein the first marker corresponds to a current parameter value;

extend from a center point toward the set of markers; and rotate about the center point of the analog display; and controlling, by the processing circuitry, a dial to indicate a set point parameter value by indicating a second marker of the set of markers which corresponds to the set point parameter value.

14. The method of claim 13, wherein the dial comprises a set of LEDs, and wherein the method further comprises:

comparing, by the processing circuitry, the set point parameter value with the current parameter value, causing, by the processing circuitry if the set point parameter value is lower than the current parameter value, the set of LEDs to output a first optical signal representing a first color; and causing, by the processing circuitry if the set point parameter value is not lower than the current parameter value, an instruction for the set of LEDs to output a second optical signal representing a second color.

15. The method of claim 13, wherein controlling the dial to indicate the set point parameter value comprises controlling a set of LEDs to indicate the second marker, wherein controlling the stepper motor comprises controlling the stepper motor to align the rotatable pointer with the first marker.

16. The method of claim 15, wherein the method further comprises:

receiving, by the processing circuitry from a temperature sensor, information indicative of the current parameter value; and controlling, by the processing circuitry, the stepper motor to align the rotatable pointer with the first marker of the set of markers which corresponds to the current parameter value based on the information indicative of the current parameter value.

17. The method of claim 15, wherein the method further comprises:

receiving, by the processing circuitry, a rotation input to the dial, wherein the rotation input represents a user selection of the set point parameter value; and causing, by the processing circuitry, the dial to control the set of LEDs to indicate the second marker based on the user selection of the set point parameter value.

18. The method of claim 17, wherein the dial is located at an outer circumference of the device, and wherein the method further comprises:

generating, by dial circuitry of the dial, an electrical signal including information indicative of the rotation input based on one or both of a rotational position of a circular knob or a rotational movement of the circular knob; and outputting, by the dial circuitry, the electrical signal to the processing circuitry.

19. The method of claim 15, wherein the method further comprises:

receiving, by the processing circuitry from a remote device, a user selection of the set point parameter value; and causing, by the processing circuitry, the dial to control the set of LEDs to indicate the second marker based on the user selection of the set point parameter value.

20. A device for controlling a heating, ventilation, and air conditioning (HVAC) system within a building, the device comprising:

an analog display comprising:
a set of markers;
a stepper motor; and
a rotatable pointer connected to the stepper motor,
wherein the rotatable pointer is configured to:
extend along a radius of the analog display;
extend from a center point toward the set of markers; and
rotate about the center point of the analog display; and processing circuitry configured to:
control the stepper motor in order to cause the rotatable pointer to indicate a first marker of the set of markers, wherein the first marker corresponds to a current temperature;
control a dial to indicate a set point parameter value by indicating a second marker of the set of markers which corresponds to the set point parameter value; and
control the stepper motor to cause the rotatable pointer to indicate an operating mode of the HVAC system.

* * * * *